UNITED STATES PATENT OFFICE.

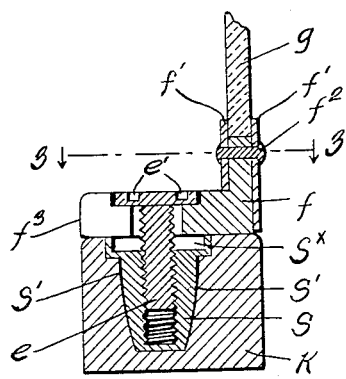
Fig 2.
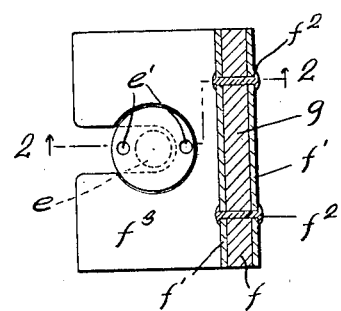
Fig 3.
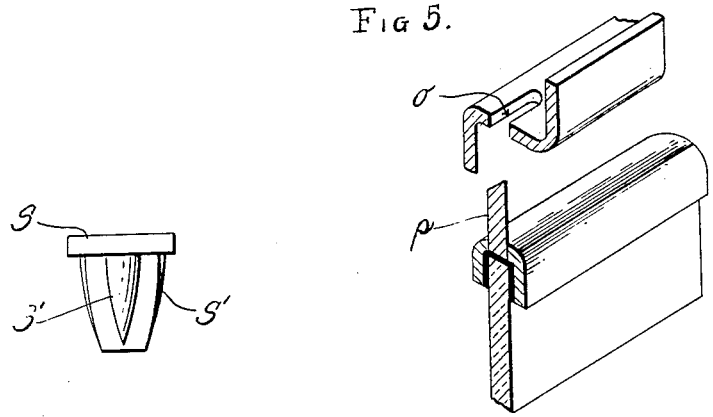
Fig 5.
Fig 4.
Harry E. Adams
Inventor

HARRY E. ADAMS, OF NEW YORK, N. Y.

SECURING MEANS FOR INCLOSURES FOR AUTOMOBILE-TOPS.

1,387,634.  Specification of Letters Patent.  Patented Aug. 16, 1921.

Application filed August 5, 1919. Serial No. 315,558.

*To all whom it may concern:*

Be it known that I, HARRY E. ADAMS, resident of New York city, borough of Manhattan, county and State of New York, have invented certain new and useful Improvements in Securing Means for Inclosures for Automobile-Tops, of which the following is a specification.

While applicable to vehicle closures generally, my invention is particularly adapted for utilization in conjunction with convertible automobile bodies designed for use either in open touring car form, or for equipment in closed limousine form, as may be found most expedient, the main object being the provision of conveniently manipulatable and substantially rigid means for the support of the detachable side sections when positioned upon the sills of the car body, and the invention consisting in the specific construction and arrangement of parts described and claimed, a distinctive feature being the embedment in the sills of non-rotatable screw nut socket members for engagement with coupling screws which pass through and bear against base flanges on the sashes of the detachable panels, all as hereinafter set forth.

In the accompanying drawings,

Fig. 2, is a vertical section taken upon plane of line 2—2, Fig. 3, through one of the car sills and the lower part of a side panel secured thereto by my coupling means;

Fig. 3, is a horizontal section taken upon plane of line 3—3, Fig. 2;

Fig. 4, is a detail elevation of one of the screw nut socket members;

Fig. 5, is an isometrical sectional perspective illustrating the means whereby the upper portions of the side panels other than the door panels (the stationary panels, so called) are detachably secured to the car top.

Figure 1:
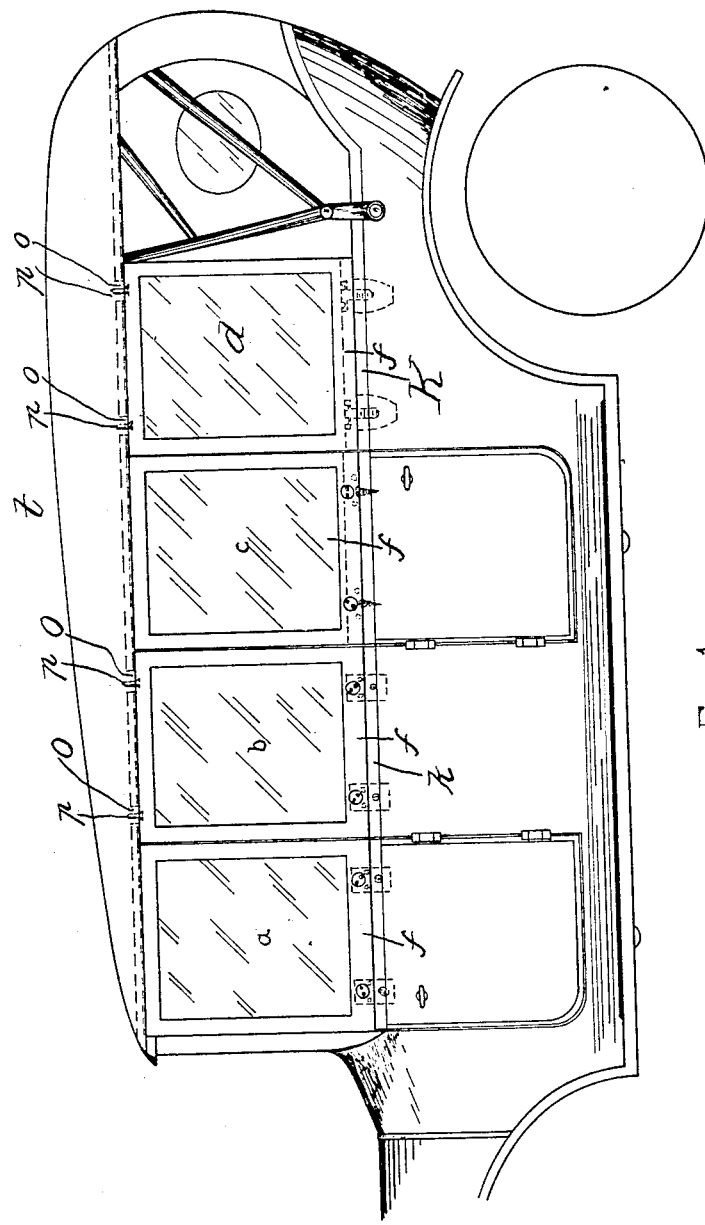
Figure 1, is a side elevation of a car body of the type to which my invention relates, showing detachable side sections in place upon the sill, and attached thereto, and to the car top.

In Fig. 1, $a$, $b$, $c$, $d$, represent detachable side panels, $a$, and $c$, being the door panels, and $b$ and $d$, the intermediate or so called stationary panels. The latter are secured to the top $t$, of the car by pins $p$, positioned upon the upper edges of the said panels $b$, $d$, and projecting into oblong slots $o$, in the edge of the top $t$, said slots $o$, being elongated so that the pins $p$, do not impede longitudinal creep or movement of the top $t$, when the car is in motion. This method of top attachment will be understood more particularly by reference to Fig. 5, of the drawings.

$g$, represents the glass or other transparent medium used in the side panels, the lower edges thereof resting on the lower member $f$, of the sash frame and being held thereto by and between side flange plates $f'$, $f'$, as shown more particularly in Fig. 2, of the drawings, said flange plates $f'$, $f'$, being secured to the said lower member $f$, of the sash frame by means of rivets $f^2$, $f^2$, or equivalent means, as may be found most expedient.

The lower member $f$, of each sash frame is formed with an inturned sill-bearing flange $f^3$, approximately the width of the sill $k$, of the car body K, and this sill-bearing flange $f^3$, is countersunk at two points to accommodate the shank and head of a coupling screw $e$, the threaded end of which engages with the female thread in a non-rotatable screw nut socket member $s$, embedded in the sill $k$, as shown in Fig. 2.

The body portion of each of the embedded socket pieces $s$, is convergent or wedge shaped, and is formed with peripheral grooves $s'$, $s'$, the edges of which, contacting intimately with the portion of sill in which the screw nut socket is embedded, counteracting any tendency of said screw nut socket piece $s$, to rotate on its axis, during copulation with the screw $e$. The head of the latter is formed with key or driver holes $e'$, $e'$, or equivalent means of effecting its rotation.

The means thus afforded for the attachment of the side section sashes to the sill are simple, but effective and positive in character, and of easy manipulation, so that the side sections may be quickly and conveniently applied to or removed from the side sills of the car.

The outer ends of the screw nut (non-rotatable) socket members $s$, are formed with recesses $s^x$, for the accommodation of the heads of the coupling screws $e$, when the sashes are removed, so that the upper side of sill $k$, will present a flush, even, unobstructed surface when the side sections are not in use; and in a similar manner, and for a like purpose, the upper sides of the sash base flanges $f^3$, are recessed for the accommodation of the head $e^x$, of the coupling screw, as shown in Fig. 2.

What I claim as my invention and desire to secure by Letters Patent is,

1. Securing means for automobile top closure sashes, comprising a screw nut socket member countersunk in the car sill, a recessed sash base flange, and a coupling screw extending therethrough and engaging with the said screw nut socket member, the head of the said screw being countersunk in the sash base flange and bearing directly thereon when in use, and said screw nut socket member being formed with a recess adapted to receive the head of said coupling screw when the sash is removed from the sill, for the purpose set forth.

2. Securing means for automobile top closure sashes, comprising a screw nut socket member countersunk in the car sill, a recessed sash base flange, and a coupling screw extending therethrough and engaging with the said screw nut socket member, the latter being formed with a recess adapted to receive the head of said coupling screw when the sash is removed, for the purpose described.

3. Securing means for automobile top closure sashes, comprising a recessed sash base formed with a countersink for the head of a coupling screw, said coupling screw extending therethrough and engaging with a conoidal screw nut socket member embedded in the sill of the car, said conoidal screw socket member being formed with peripheral longitudinal ribs to prevent rotation, and being also formed with a recess adapted to countersink the head of said coupling screw when the sash is removed from the sill, for the purpose described.

HARRY E. ADAMS.

Witnesses:
 ALFRED EMMERSON,
 AGNES S. GRIEVE.